United States Patent
Xu et al.

(10) Patent No.: US 12,224,824 B2
(45) Date of Patent: Feb. 11, 2025

(54) ANTENNA POWER CONTROL METHOD AND ELECTRONIC DEVICE

(71) Applicant: HONOR DEVICE CO., LTD., Guangdong (CN)

(72) Inventors: Yuan Xu, Shenzhen (CN); Hang Meng, Shenzhen (CN); Kunpeng Wei, Shenzhen (CN); Shaojie Chu, Shenzhen (CN)

(73) Assignee: Honor Device Co., Ltd.., Shenzhen (CN)

( * ) Notice: Subject to any disclaimer, the term of this patent is extended or adjusted under 35 U.S.C. 154(b) by 0 days.

(21) Appl. No.: 18/261,227

(22) PCT Filed: Dec. 19, 2022

(86) PCT No.: PCT/CN2022/140089
§ 371 (c)(1),
(2) Date: Jul. 12, 2023

(87) PCT Pub. No.: WO2023/138282
PCT Pub. Date: Jul. 27, 2023

(65) Prior Publication Data
US 2024/0413865 A1   Dec. 12, 2024

(30) Foreign Application Priority Data
Jan. 24, 2022   (CN) .......................... 202210082431.1

(51) Int. Cl.
*H04B 7/0426*   (2017.01)
*H04B 1/38*   (2015.01)
(Continued)

(52) U.S. Cl.
CPC ......... *H04B 7/0608* (2013.01); *H04B 1/3838* (2013.01); *H04B 1/401* (2013.01)

(58) Field of Classification Search
CPC ..... H04B 7/0608; H04B 1/3838; H04B 1/401
See application file for complete search history.

(56) References Cited

U.S. PATENT DOCUMENTS 9,867,139 B1   1/2018   Khasgiwala et al.
9,973,228 B2 *   5/2018   Heikura ................. H01Q 5/378
(Continued)

FOREIGN PATENT DOCUMENTS

CN   102810126 A   12/2012
CN   105939417 A   9/2016
(Continued)

*Primary Examiner* — David S Huang
(74) *Attorney, Agent, or Firm* — Fish & Richardson P.C.

(57) ABSTRACT

Embodiments of this application disclose an antenna power control method and an electronic device. The specific solution is: obtaining, by a first sensor, statuses of at least two detection channels, where each of the detection channels corresponds to one status, the status is any one of a first state and a second state, the first state indicates that a value of capacitance between an antenna corresponding to the detection channel and a human body is greater than a first threshold, and the second state indicates that the value of the capacitance between the antenna corresponding to the detection channel and the human body is less than the first threshold; determining, by a first driving module, a first range value based on the statuses of the at least two detection channels; and controlling, by the processor, transmit power of the at least two antennas based on the first range value.

13 Claims, 9 Drawing Sheets

(51) Int. Cl.
*H04B 1/3827* (2015.01)
*H04B 1/401* (2015.01)
*H04B 7/06* (2006.01)

(56) References Cited

U.S. PATENT DOCUMENTS

| | | | |
|---|---|---|---|
| 11,095,322 | B2 | 8/2021 | Li |
| 11,191,035 | B2 | 11/2021 | Liu et al. |
| 2017/0279186 | A1 | 9/2017 | Xia |
| 2021/0212000 | A1 | 7/2021 | Han et al. |
| 2021/0250873 | A1 | 8/2021 | Liu et al. |
| 2023/0261718 | A1 | 8/2023 | Hongcheng |
| 2023/0353172 | A1* | 11/2023 | Kim .......................... H04B 1/50 |
| 2024/0072427 | A1* | 2/2024 | Luo .......................... H01Q 1/48 |

FOREIGN PATENT DOCUMENTS

| | | |
|---|---|---|
| CN | 106953648 A | 7/2017 |
| CN | 104639691 B | 3/2018 |
| CN | 109327235 A | 2/2019 |
| CN | 109889214 A | 6/2019 |
| CN | 110572172 A | 12/2019 |
| CN | 111405652 A | 7/2020 |
| CN | 111511006 A | 8/2020 |
| CN | 113612875 A | 11/2021 |
| CN | 113905433 A | 1/2022 |
| CN | 114567355 A | 5/2022 |
| EP | 3863182 A1 | 8/2021 |
| WO | 2021254078 A1 | 12/2021 |

* cited by examiner

ANTENNA POWER CONTROL METHOD AND ELECTRONIC DEVICE

CROSS-REFERENCE TO RELATED APPLICATIONS

This application is a national stage of International Application No. PCT/CN2022/140089 filed on Dec. 19, 2022 which claims priority to Chinese Patent Application No. 202210082431.1, filed on Jan. 24, 2022. The disclosures of the aforementioned application are hereby incorporated by reference in their entireties.

TECHNICAL FIELD

Embodiments of this application relate to the field of antennas, and in particular, to an antenna power control method and an electronic device.

BACKGROUND

An antenna is a component configured to transmit or receive an electromagnetic wave in an electronic device. Generally, higher power of an electromagnetic wave that can be transmitted or received by an antenna indicates better over the air (Over the Air, OTA) performance of the antenna and a stronger communication capability of a corresponding electronic device. However, an electromagnetic wave with too high power affects human health.

Impact of an electromagnetic wave on a human body may be measured through a specific absorption rate (Specific Absorption Rate, SAR). A larger SAR value indicates greater adverse impact on human health. To protect users, most market access has imposed a requirement on SAR values of electronic devices.

Generally, if a plurality of antennas transmit electromagnetic waves of same power, an antenna closer to the human body has a larger SAR value. A smaller distance between the antenna and the human body indicates a larger value of capacitance between the antenna and the human body. A specific absorption rate sensor (SAR Sensor) can detect the capacitance between the antenna and the human body, so as to determine an antenna with a larger SAR value.

In a multi-antenna scenario, each SAR sensor may be provided with a plurality of channels, and are separately connected to different antennas through the plurality of channels, to monitor the plurality of antennas. However, when a quantity of antennas increases, a processor of an electronic device needs to process a larger amount of data, and processing pressure is huge.

SUMMARY

The embodiments of this application provide an antenna power control method and an electronic device, and can reduce data processing pressure on a processor in the electronic device in a multi-antenna scenario.

To achieve the foregoing objective, the following technical solutions are used in the embodiments of this application:

According to a first aspect, an antenna power control method is provided. The method is applied to an electronic device, and the electronic device includes a processor, a first driving module, a first sensor, at least two detection channels, and at least two antennas. The first sensor is connected to the at least two antennas through the detection channels, and each of the antennas corresponds to one detection channel. The method includes: obtaining, by the first sensor, statuses of the at least two detection channels, where each of the detection channels corresponds to one status, the status is any one of a first state and a second state, the first state indicates that a value of capacitance between an antenna corresponding to the detection channel and a human body is greater than a first threshold, and the second state indicates that the value of the capacitance between the antenna corresponding to the detection channel and the human body is less than the first threshold; determining, by the first driving module, a first range value based on the statuses of the at least two detection channels; and controlling, by the processor, transmit power of the at least two antennas based on the first range value.

Based on this solution, the first driving module encapsulates the statuses of the at least two detection channels into the first range value, so that the processor can control the transmit power of the antennas based on the first range value, thereby reducing an amount of data processed by the processor and data processing pressure on the processor.

In a possible design, the determining, by the first driving module, a first range value based on the statuses of the at least two detection channels includes: determining, by the first driving module, the first range value based on the statuses of the at least two detection channels and a preset first mapping relationship, where the first mapping relationship includes a mapping relationship between the statuses of the at least two detection channels and the first range value. Based on this solution, the first driving module determines, by searching the first mapping relationship, the first range value quickly with high accuracy.

In a possible design, the first mapping relationship includes a mapping relationship between the statuses of the at least two detection channels, a status of at least one extended detection channel, and the first range value. The status of the extended detection channel is any one of a third state and a fourth state. The third state indicates that a value of capacitance between an antenna connected to the extended detection channel and the human body is greater than the first threshold. The fourth state indicates that the extended detection channel does not exist in the electronic device, or that the value of the capacitance between the antenna connected to the extended detection channel and the human body is less than the first threshold. The determining, by the first driving module, the first range value based on the statuses of the at least two detection channels and a preset first mapping relationship includes: determining, by the first driving module, the first range value based on the statuses of the at least two detection channels, the status of the at least one extended detection channel, and the preset first mapping relationship. Based on this solution, when a quantity of the detection channels in the sensor increases, the first mapping relationship in this solution does not need to be changed, and has good compatibility and scalability.

In a possible design, the controlling, by the processor, transmit power of the at least two antennas based on the first range value includes: receiving, by the processor, the first range value by using a first interface function, where the first range value corresponds to the statuses of the at least two detection channels and the status of the at least one extended detection channel; and controlling, by the processor, the transmit power of the at least two antennas based on the first range value. Based on this solution, the processor is configured with the interface function used for receiving the range value of the first sensor, so that the processor is suitable for sensors having different detection channels, thereby having high compatibility.

In a possible design, the controlling, by the processor, transmit power of the at least two antennas based on the first range value includes: determining, by the processor, first power of each of the at least two antennas based on the first range value; and controlling, by the processor, the transmit power of the at least two antennas based on the first power of each antenna. Based on this solution, the processor can control the transmit power of each antenna with high control precision.

In a possible design, the controlling, by the processor, transmit power of the at least two antennas based on the first range value includes: determining, by the processor, a first antenna and second power based on the first range value, where a status of a detection channel corresponding to the first antenna is the first state, and the first antenna is included in the at least two antennas; and adjusting, by the processor, transmit power of the first antenna to the second power. Based on this solution, the processor needs to adjust the transmit power of only the antenna whose status is the first state to the first power, thereby having small data processing pressure.

In a possible design, the determining, by the processor, a first antenna and second power based on the first range value includes: determining, by the processor, the first antenna and the second power based on the first range value and a preset second mapping relationship, where the second mapping relationship includes a mapping relationship between the first range value, the first antenna, and the second power. Based on this solution, the processor determines, by searching the second mapping relationship, the first range value quickly with high accuracy.

In a possible design, the obtaining, by the first sensor, statuses of the at least two detection channels includes: obtaining, by the first sensor, values of capacitance between the at least two antennas and the human body; and determining, by the first sensor when a value of capacitance between a second antenna and the human body is greater than the first threshold, a status of a detection channel corresponding to the second antenna as the first state, where the second antenna is included in the at least two antennas. Based on this solution, the first sensor can conveniently determine the statuses of the detection channels based on the values of the capacitance between the antennas and the human body.

In a possible design, the obtaining, by the first sensor, values of capacitance between the at least two antennas and the human body includes: obtaining, by the first sensor, the values of the capacitance between the at least two antennas and the human body through the at least two detection channels. Based on this solution, the first sensor can conveniently detect the values of the capacitance between the antennas and the human body through the detection channels.

In a possible design, the electronic device further includes an earpiece, and the method further includes: obtaining, by the processor, a status of the earpiece, where the status of the earpiece includes an on state and an off state; and lowering, by the processor, transmit power of a third antenna if the earpiece is in the on state, where the third antenna is an antenna whose distance from the earpiece is less than a third threshold, and the third antenna is included in the at least two antennas. Based on this solution, when a user communicates through the earpiece, an antenna nearby the earpiece has less adverse impact on health of the user, and the communication performance of the electronic device can be ensured.

In a possible design, the processor is an application processor. Based on this solution, data processing efficiency can be increased.

According to a second aspect, an electronic device is provided, including one or more processors and one or more memories. The one or more memories are coupled to the one or more processors, and the one or more memories store computer instructions. When the one or more processors execute the computer instructions, the electronic device is enabled to perform the antenna power control method according to any one of the first aspect and the possible designs thereof.

According to a third aspect, a chip system is provided. The chip system includes a processing circuit and an interface. The processing circuit is configured to invoke and run a computer program stored in a storage medium, to perform the antenna power control method according to any one of the first aspect and the possible designs thereof.

According to a fourth aspect, a computer-readable storage medium is provided, including a computer instruction. When the computer instruction is run, the antenna power control method according to any one of the first aspect and the possible designs thereof is performed.

It is to be understood that the technical features of the technical solutions provided in the second, third, and fourth aspects above can all correspond to the antenna power control method provided in the first aspect and possible designs thereof, so the similar beneficial effects can be achieved. Details are not described herein again.

DESCRIPTION OF EMBODIMENTS

In the embodiments of this application, "first", "second", "third", and the like are intended to distinguish between different objects but do not indicate a particular order. In addition, the term, such as "exemplary" or "for example", is used to represent giving an example, an illustration, or a description. Any embodiment or design scheme described by using "exemplary" or "for example" in the embodiments of this application should not be explained as being more preferred or having more advantages than another embodiment or design scheme. Exactly, the term such as "exemplary" or "for example" is intended to present a related concept in a specific manner.

For ease of understanding the embodiments of this application, an application background of the embodiments of this application is first introduced below.

An antenna is a component configured to transmit or receive an electromagnetic wave in an electronic device. Generally, higher power of an electromagnetic wave that can be transmitted or received by an antenna indicates better OTA performance of the antenna and a stronger communication capability. However, an electromagnetic wave with too high power affects human health. A SAR can be used to measure impact of electromagnetic waves on a human body. Generally, a larger SAR value of an antenna indicates greater adverse impact on human health.

Generally, if a plurality of antennas transmit electromagnetic waves of same power, an antenna closer to the human body has a larger SAR value. A smaller distance between the antenna and the human body indicates a larger value of capacitance between the antenna and the human body. Therefore, a SAR value of an antenna may be determined by detecting a value of capacitance between the antenna and the human body.

A SAR sensor can detect the value of the capacitance between the antenna and the human body. The value of the capacitance between the antenna and the human body is related to a distance between the antenna and the human body. Generally, in a case that the human body is close to the antenna, the value of the capacitance between the antenna and the human body is large. In a case that the human body is away from the antenna, the value of the capacitance between the antenna and the human body is small. To be specific, the value of the capacitance between the antenna and the human body detected by the SAR sensor can indicate the distance between the antenna and the human body.

Figure 1:
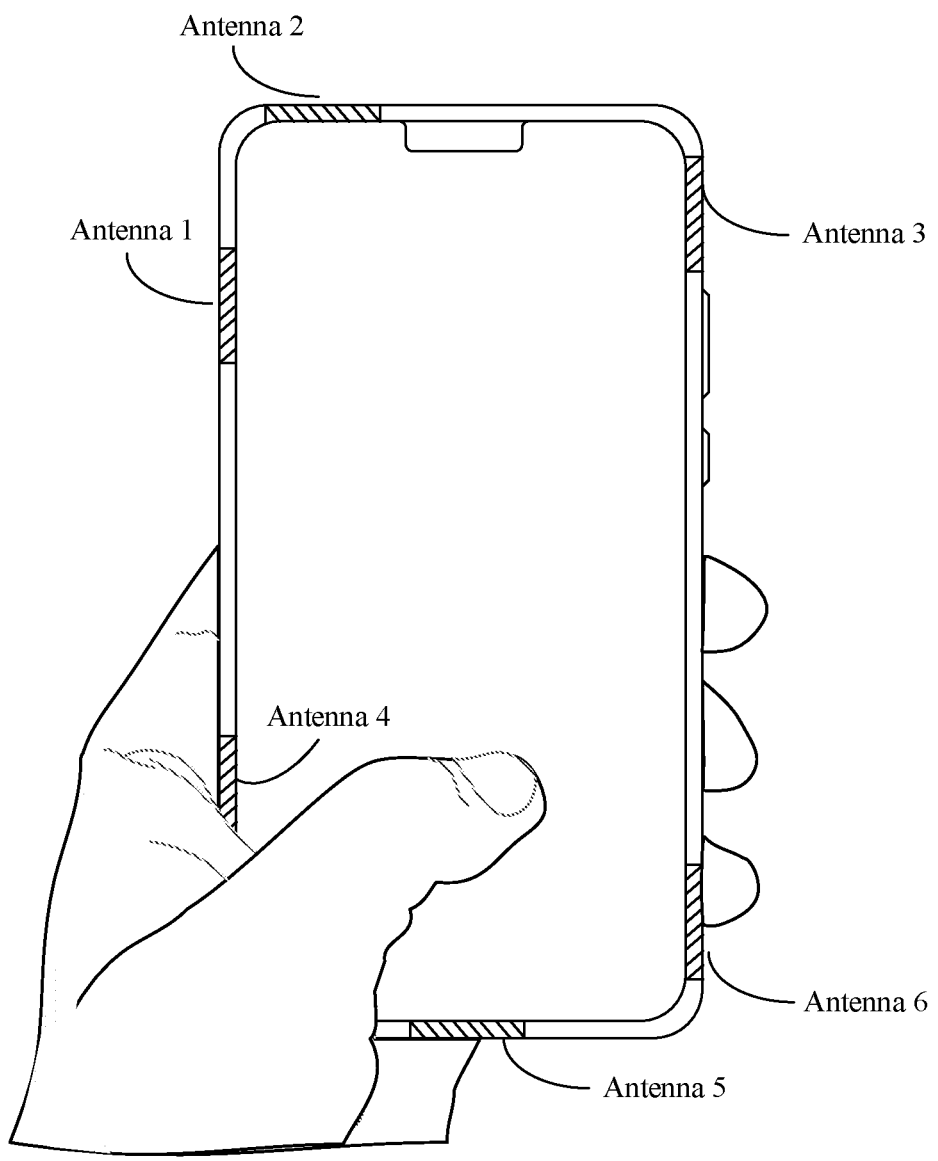
FIG. 1 is a schematic diagram of holding an electronic device.

FIG. 1 is a schematic diagram of holding an electronic device. As shown in FIG. 1, an antenna 1, an antenna 2, and an antenna 3 each have a longer distance from a hand, and therefore, values of capacitance between the antenna 1 and the human body, between the antenna 2 and the human body, and between the antenna 3 and the human body are all smaller. An antenna 4, an antenna 5, and an antenna 6 each have a shorter distance from the human body, and therefore, values of capacitance between the antenna 4 and the human body, between the antenna 5 and the human body, and between the antenna 6 and the human body are all larger.

In the embodiments of this application, the distance between the antenna and the human body may be identified by the value of the capacitance between the antenna and the human body. For example, that the SAR sensor detects an antenna having a short distance from the human body may specifically be that the SAR sensor detects an antenna for which a value of capacitance between the antenna and the human body is large. That the SAR sensor detects that the distance between the antenna and the human body is less than a preset distance may specifically be that the SAR sensor detects that the value of the capacitance between the antenna and the human body is greater than a first threshold. Details are not described below again.

The SAR sensor is usually provided with a plurality of detection channels, and different detection channels are separately connected to different antennas. The SAR sensor may detect a value of capacitance between a corresponding antenna and the human body through the detection channel.

Figure 2:
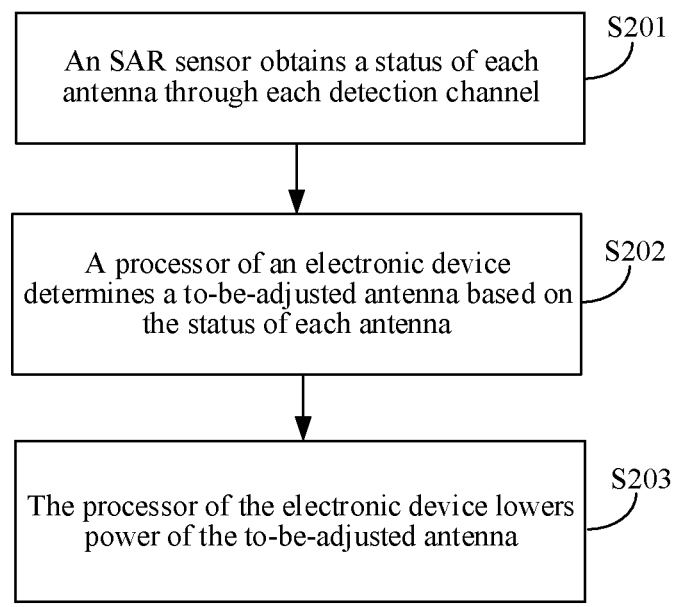
FIG. 2 is a flowchart of lowering a SAR value of an antenna by using a SAR sensor.

A process of lowering the SAR of the antenna by the electronic device through the SAR sensor is described below: FIG. 2 is a flowchart of lowering a SAR value of an antenna by using a SAR sensor.

S201. The SAR sensor obtains a status of each antenna through each detection channel.

In this embodiment of this application, when the detection channel transmits a first signal, a status of the detection channel may be referred to as a trigger state of the detection channel. When the detection channel transmits a second signal, the status of the detection channel is referred to as a non-trigger state of the detection channel. It is to be noted that, the trigger state may also be referred to as a first state, and the non-trigger state may also be referred to as a second state.

S202. A processor of the electronic device determines a to-be-adjusted antenna based on the status of each antenna.

The to-be-adjusted antenna is an antenna corresponding to a detection channel in the trigger state. FIG. 1 is used as an example. A driving module of the SAR sensor sends a status of the antenna 1 and a status of the antenna 2 to the processor of the electronic device. The processor of the electronic device determines a to-be-adjusted antenna based on the status of the antenna 1 and the status of the antenna 2. For example, if a detection channel corresponding to the antenna 1 is in the first state, and a detection channel corresponding to the antenna 2 is in the second state, the processor of the electronic device may determine that the to-be-adjusted antenna is the antenna 1. If the detection channel corresponding to the antenna 1 and the detection channel corresponding to the antenna 2 both are in the first state, the processor of the electronic device may determine that to-be-adjusted antennas are the antenna 1 and the antenna 2.

S203. The processor of the electronic device lowers power of the to-be-adjusted antenna.

For example, if the antenna 1 is the to-be-adjusted antenna, the processor of the electronic device may deliver a power reduction instruction to the antenna 1, to instruct the antenna 1 to lower power of radiated or received electromagnetic waves, thereby achieving the effect of reducing a SAR value of the antenna 1.

As can be seen from S201 to S203, to reduce the SAR value of the antenna, the processor of the electronic device needs to obtain the statuses of all antennas in the SAR sensor, and therefore determines the to-be-adjusted antenna. However, when a quantity of the antennas in the electronic device increases, in other words, when a quantity of the detection channels in the SAR sensor increases, the processor of the electronic device needs to process a larger amount of data, which results in considerable data processing pressure.

To resolve the foregoing problem, the embodiments of this application provide an antenna power control method, which can reduce an amount of data processed by a processor in an electronic device in a multi-antenna scenario, thereby reducing data processing pressure on the processor of the electronic device.

The solution provided in the embodiments of this application is described below in detail with reference to the accompanying drawings. It is to be noted that, the antenna power control method provided in this embodiment of this application may be applied to an electronic device of a user. The electronic device may be a device with a communication function. For example, the electronic device may be a portable mobile device having a communication function, such as a mobile phone, a tablet computer, a personal digital assistant (personal digital assistant, PDA), an augmented reality (augmented reality, AR)\virtual reality (virtual reality, VR) device, and a media player, or the electronic device may be a wearable electronic device such as a smartwatch. A specific form of the device is not particularly limited in the embodiments of this application.

Figure 3:
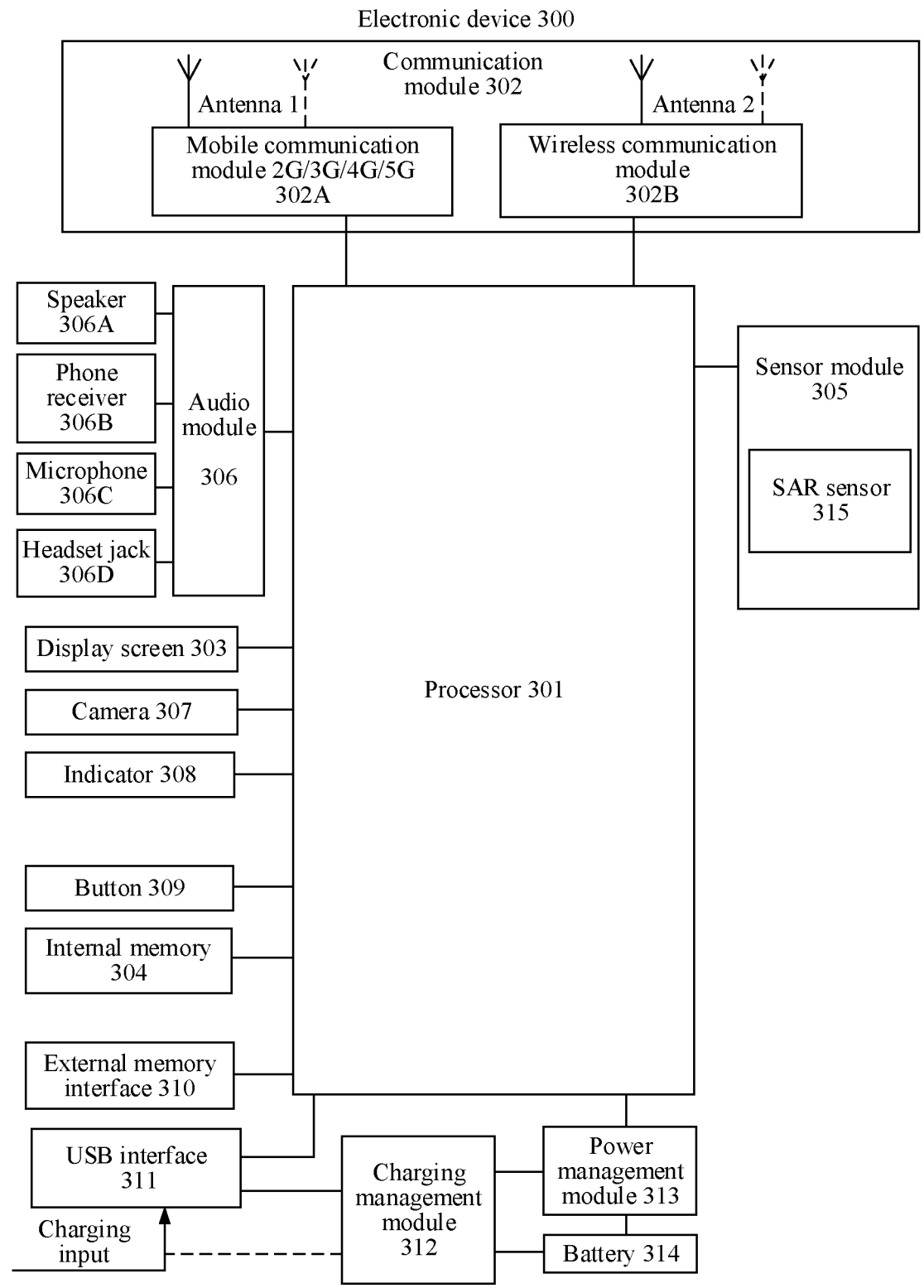
FIG. 3 is a schematic diagram of composition of an electronic device according to an embodiment of this application.

In an example, FIG. 3 is a schematic diagram of composition of an electronic device 300 according to an embodiment of this application. The antenna power control method provided in the embodiments of this application is applicable to the electronic device 300 shown in FIG. 3.

As shown in FIG. 3, the electronic device 300 may include a processor 301, a display screen 303, a communication module 302, and the like.

The processor 301 may include one or more processing units. For example, the processor 301 may include an application processor (application processor, AP), a modem processor, a graphics processing unit (graphics processing unit, GPU), an image signal processor (image signal processor, ISP), a controller, a memory, a video stream codec, a digital signal processor (digital signal processor, DSP), a baseband processor, and/or a neural-network processing unit (neural-network processing unit, NPU), and the like. Different processing units may be independent components, or may be integrated into one or more processors 301.

The controller may be a nerve center and a command center of the electronic device 300. The controller may generate an operation control signal according to instruction operation code and a time-sequence signal, and control obtaining and executing of instructions.

A memory may also be disposed in the processor 301, configured to store instructions and data. In some embodiments, the memory in processor 301 is a cache memory. The memory may store an instruction or data that has just been used or cyclically used by the processor 301. If the processor 301 needs to use the instruction or the data again, the processor may directly invoke the instruction or the data from the memory, to avoid repeated access and reduce a waiting time of the processor 301, thereby improving system efficiency.

In some embodiments, the processor 301 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor 301 interface (mobile industry processor interface, MIPI), a general-purpose input/output (general-purpose input/output, GPIO) interface, a subscriber identity module (subscriber identity module, SIM) interface, a universal serial bus (universal serial bus, USB) interface 311, and/or the like.

The electronic device 300 implements a display function by using the GPU, the display screen 303, the AP 301, and the like. The GPU is a microprocessor for image processing, and is connected to the display screen 303 and the AP 301. The GPU is configured to perform mathematical and geometric calculation, and is configured to render an image. The processor 301 may include one or more GPUs that execute a program instruction to generate or change display information.

The display screen 303 is configured to display an image, a video stream, and the like.

The communication module 302 may include an antenna 1, an antenna 2, a mobile communication module 302A, and/or a wireless communication module 302B. An example in which the communication module 302 includes the antenna 1, the antenna 2, the mobile communication module 302A, and the wireless communication module 302B is used.

A wireless communication function of the electronic device 300 may be implemented by using the antenna 1, the antenna 2, the mobile communication module 302A, the wireless communication module 302B, the modem processor, the baseband processor, and the like.

The antenna 1 and the antenna 2 are configured to transmit and receive electromagnetic wave signals. Each antenna of the electronic device 300 may be configured to cover one or more communication frequency bands. Different antennas may be multiplexed to improve antenna utilization. For example, the antenna 1 may be multiplexed into a diversity antenna of a wireless local area network. In some other embodiments, the antennas may be used with a tuning switch.

The mobile communication module 302A may provide a solution to wireless communication such as 2G/3G/4G/5G applied to the electronic device 300. The mobile communication module 302A may include at least one filter, a switch, a power amplifier, a low noise amplifier (low noise amplifier, LNA), and the like. The mobile communication module 302A may receive an electromagnetic wave by using the antenna 1, perform processing such as filtering and amplification on the received electromagnetic wave, and send the electromagnetic wave to the modem processor for demodulation. The mobile communication module 302A may further amplify a signal modulated by the modem processor, and convert the signal into an electromagnetic wave by using the antenna 1 for radiation. In some embodiments, at least some of functional modules of the mobile communication module 302A may be disposed in the processor 301. In some embodiments, at least some of the functional modules of the mobile communication module 302A may be disposed in a same device as at least some of modules of the processor 301.

The modem processor may include a modulator and a demodulator. The modulator is configured to modulate a to-be-sent low-frequency baseband signal into a middle/high-frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal by using an audio device (not limited to a speaker 306A, a phone receiver 306B, or the like), or displays an image or a video stream by using the display screen 303. In some embodiments, the modem processor may be an independent component. In some other embodiments, the modem processor may be independent of the processor 301, and is disposed in a same device as the mobile communication module 302A or another functional module.

The wireless communication module 302B may provide a solution to wireless communication applied to the electronic device 300, for example, a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 302B may be one or more devices that integrate at least one communication processing module. The wireless communication module 302B receives an electromagnetic wave through the antenna 2, performs frequency modulation and filtering processing on the electromagnetic wave signal, and sends the processed signal to the processor 301. The wireless communication module 302B may also receive a to-be-sent signal from the processor 301, perform frequency modulation and amplification on the to-be-sent signal, and convert the signal into an electromagnetic wave for radiation through the antenna 2.

In some embodiments, the antenna 1 and the mobile communication module 302A of the electronic device 300 are coupled, and the antenna 2 and the wireless communication module 302B of the electronic device 300 are coupled, so that the electronic device 300 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (satellite based augmentation systems, SBAS).

As shown in FIG. 3, in some implementations, the electronic device 300 may further include an external memory interface 310, an internal memory 304, a universal serial bus (universal serial bus, USB) interface, a charging management module 312, a power management module 313, a battery 314, an audio module 306, a speaker 306A, a phone receiver 306B, a microphone 306C, a headset jack 306D, a sensor module 305, a button 309, a motor, an indicator 308, a camera 307, a subscriber identity module (subscriber identity module, SIM) card interface, and the like.

The charging management module 312 is configured to receive charging input from a charger. The charger may be a wireless charger, or may be a wired charger. In some embodiments of wired charging, the charging management module 312 may receive charging input of the wired charger through the USB interface 311. In some embodiments of wireless charging, the charging management module 312 may receive wireless charging input by using a wireless charging coil of the electronic device 300. When charging the battery 314, the charging management module 312 may further supply power to the electronic device 300 by using the power management module 313.

The power management module 313 is configured to be connected to the battery 314, the charging management module 312, and the processor 301. The power management module 313 receives input of the battery 314 and/or the charging management module 312, to supply power to the processor 301, the internal memory 304, an external memory, the display screen 303, the camera 307, the wireless communication module 302B, and the like. The power management module 313 may be further configured to monitor a parameter such as a capacity of the battery 314, a cycle count of the battery 314, or a health state (electric leakage and impedance) of the battery 314. In some other embodiments, the power management module 313 may alternatively be disposed in the processor 301. In some other embodiments, the power management module 313 and the charging management module 312 may alternatively be disposed in a same device.

The external memory interface 310 may be configured to be connected to an external storage card such as a micro SD card, to expand a storage capability of the electronic device 300. The external storage card communicates with the processor 301 by using the external memory interface 310, so as to implement a data storage function, for example, store files such as music and a video stream into the external storage card.

The internal memory 304 may be configured to store computer-executable program code. The executable program code includes an instruction. The processor 301 runs the instruction stored in the internal memory 304, to implement various functional applications and data processing of the electronic device 300.

The electronic device 300 may implement an audio function such as music playing or recording by using the audio module 306, the speaker 306A, the phone receiver 306B, the microphone 306C, the headset jack 306D, the AP 301, and the like.

The button 309 includes a power button, a volume button, and the like. The button 309 may be a mechanical button 309, or a touch-type button 309. The electronic device 300 may receive input of the button 309, and generate button signal input related to user setting and function control of the electronic device 300.

The indicator 308 may be an indicator light that may be configured to indicate a charging state and a power change, or may be configured to indicate a message, a missed call, a notification, and the like.

The SIM card interface is configured to connect to a SIM card. The SIM card may be inserted into the SIM card interface or plugged from the SIM card interface, to come into contact with or be separated from the electronic device 300. The electronic device 300 may support one or N SIM card interfaces, N being a positive integer greater than 1. The SIM card interface may support a nano-SIM card, a micro-SIM card, a SIM card, and the like. A plurality of cards may be inserted into a same SIM card interface at the same time. The plurality of cards may be of a same type or different types. The SIM card interface may further be compatible with different types of SIM cards. The SIM card interface may also be compatible with an external memory card. The electronic device 300 interacts with a network by using a SIM card, to implement functions such as a call and data communication. In some embodiments, the electronic device 300 uses an eSIM, that is, an embedded SIM card. The eSIM card may be embedded in the electronic device 300 and cannot be separated from the electronic device 300.

The sensor module 305 in the electronic device 300 may include a component such as a touch sensor, a pressure sensor, a gyro sensor, a barometric pressure sensor, a magnetic sensor, an acceleration sensor, a distance sensor, an optical proximity sensor, an ambient light sensor, a fingerprint sensor, a temperature sensor, or a bone conduction sensor, to implement a sensing and/or obtaining function for different signals.

It is to be noted that, in this embodiment of this application, the sensor module 305 in the electronic device may further include a SAR sensor 315. The SAR sensor 315 may be provided with one or more detection channels, and each detection channel may be configured to detect a status of an antenna. An example in which the sensor is provided with two detection channels is used. The SAR sensor 315 is connected to the antenna 1 through a detection channel CH1, and connected to the antenna 2 through a detection channel CH2. In an example, the SAR sensor 315 can detect a value of capacitance between the antenna 1 and a human body and a value of capacitance between the antenna 2 and the human body. When the value of the capacitance between the antenna 1 and the human body is greater than a first threshold, the SAR sensor 315 determines that a status of the antenna 1 is a first state. When the value of the capacitance between the antenna 1 and the human body is less than or equal to the first threshold, the SAR sensor 315 determines that the status of the antenna 1 is a second state. The first threshold may be set according to a requirement, and is not specifically limited herein.

It may be understood that the schematic structure in this embodiment constitutes no specific limitation on the electronic device 300. In some other embodiments, the electronic device 300 may include more or fewer components than those shown in the figure, or some components may be combined, or some components may be split, or components are arranged in different manners. The components in the figure may be implemented by hardware, software, or a combination of software and hardware.

Figure 4:
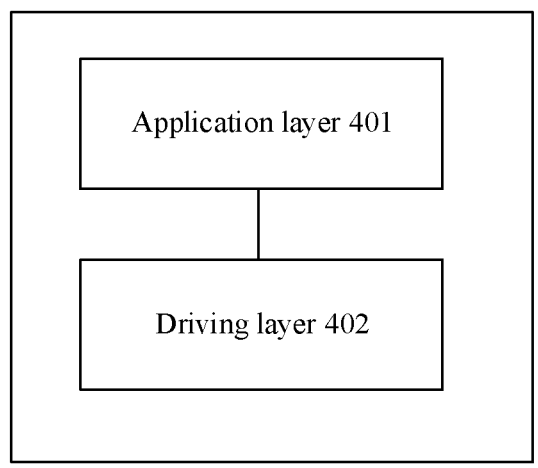
FIG. 4 is a schematic diagram of an electronic device according to an embodiment of this application.

FIG. 4 is a schematic diagram of an electronic device according to an embodiment of this application. When the antenna power control method provided in this embodiment of this application is applied to the electronic device 300 shown in FIG. 3, software in the electronic device 300 may be divided into an application layer 401 and a driving layer 402 shown in FIG. 4.

A plurality of applications may be installed on the application layer 401. In this embodiment of this application, the application layer 401 may include software configured to control antenna power. The software for controlling antenna power may be run in the processor of the electronic device.

A plurality of driving modules configured to drive hardware to work may be installed in the driving layer 402. In this embodiment of this application, the driving layer 402 may include a driving module of the SAR sensor that drives the SAR sensor to work.

It is to be noted that, the application layer 401 and the driving layer 402 may also include other content, which is not specifically limited herein.

Figure 5:
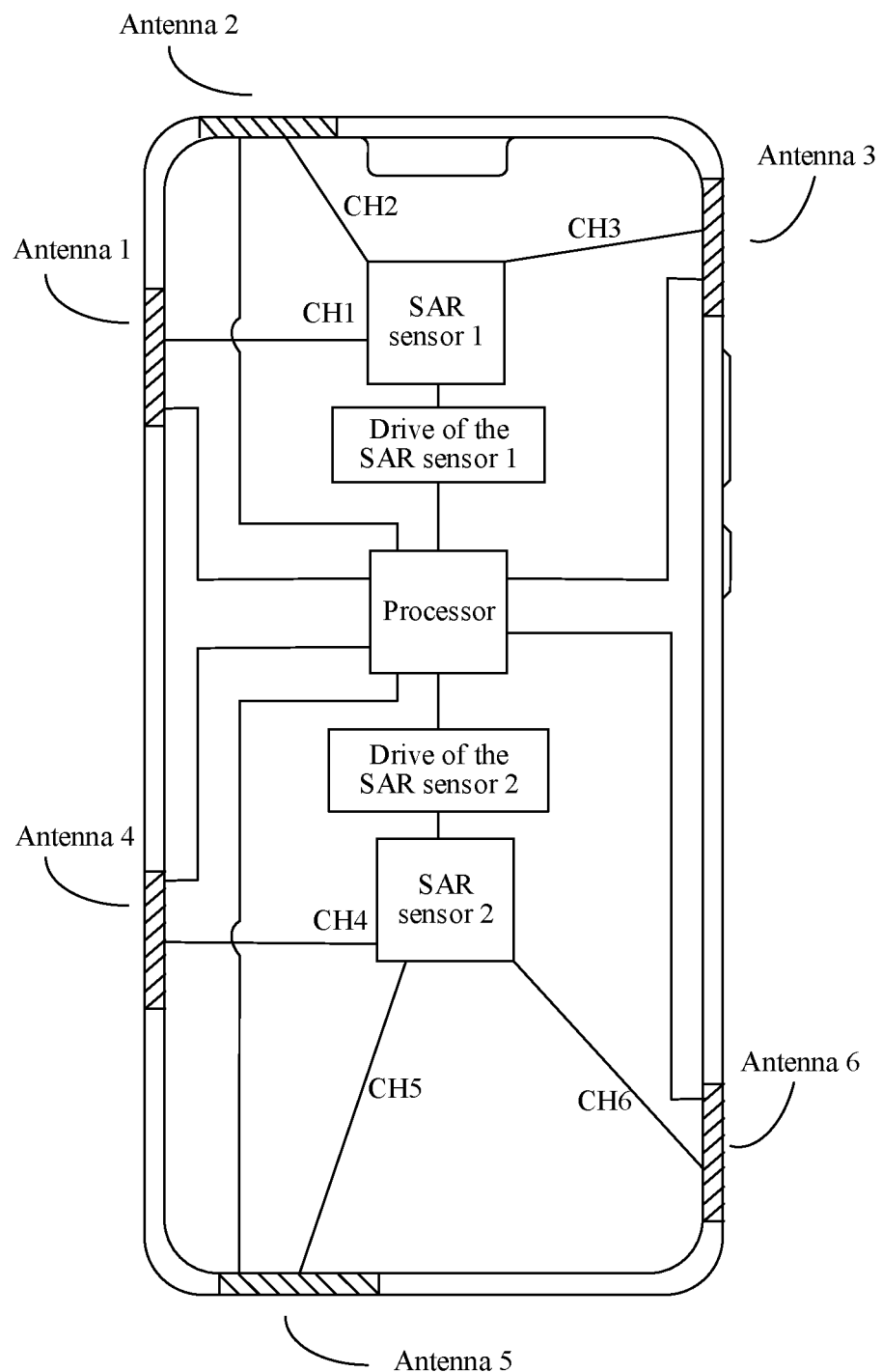
FIG. 5 is a schematic diagram of connection of antennas in an electronic device according to an embodiment of this application.

FIG. 5 is a schematic diagram of connection of antennas in an electronic device according to an embodiment of this application. As shown in FIG. 5, the electronic device may be provided with a SAR sensor 1 and a SAR sensor 2. The SAR sensor 1 is connected to a processor through a driving module of the SAR sensor 1. The SAR sensor 2 is connected to the processor through a driving module of the SAR sensor 2. The processor is separately connected to antennas. The SAR sensor 1 is connected to an antenna 1 through a detection channel CH1, connected to an antenna 2 through a detection channel CH2, and connected to an antenna 3 through a detection channel CH3. The SAR sensor 2 is connected to an antenna 4 through a detection channel CH4, connected to an antenna 5 through a detection channel CH5, and connected to an antenna 6 through a detection channel CH6. The SAR sensor 1 may detect a value of capacitance between the antenna 1 and a human body through CH1, detect a value of capacitance between the antenna 2 and the human body through CH2, and detect a value of capacitance between the antenna 3 and the human body through CH3. Similarly for the SAR sensor 2, details are not described herein again.

It is to be noted that, the SAR sensor 1 and the SAR sensor 2 in this embodiment of this application may also be referred to as first sensors, and the driving module of the SAR sensor 1 and the driving module of the SAR sensor 2 may also be referred to as first driving modules.

The antenna power control method provided in this embodiment of this application is described below in detail with reference to the schematic diagram of connection of the antennas in the electronic device provided in FIG. 5, the electronic device 300 provided in FIG. 3, and the software division of the electronic device 300 provided in FIG. 4.

It is to be noted that, the antennas in this embodiment of this application may be cellular antennas, or may be WIFI antennas, which is not limited herein. In addition, the antenna power control method provided in this embodiment of this application is applied to a multi-antenna scenario, to be specific, applied to a scenario of at least two antennas.

Figure 6:
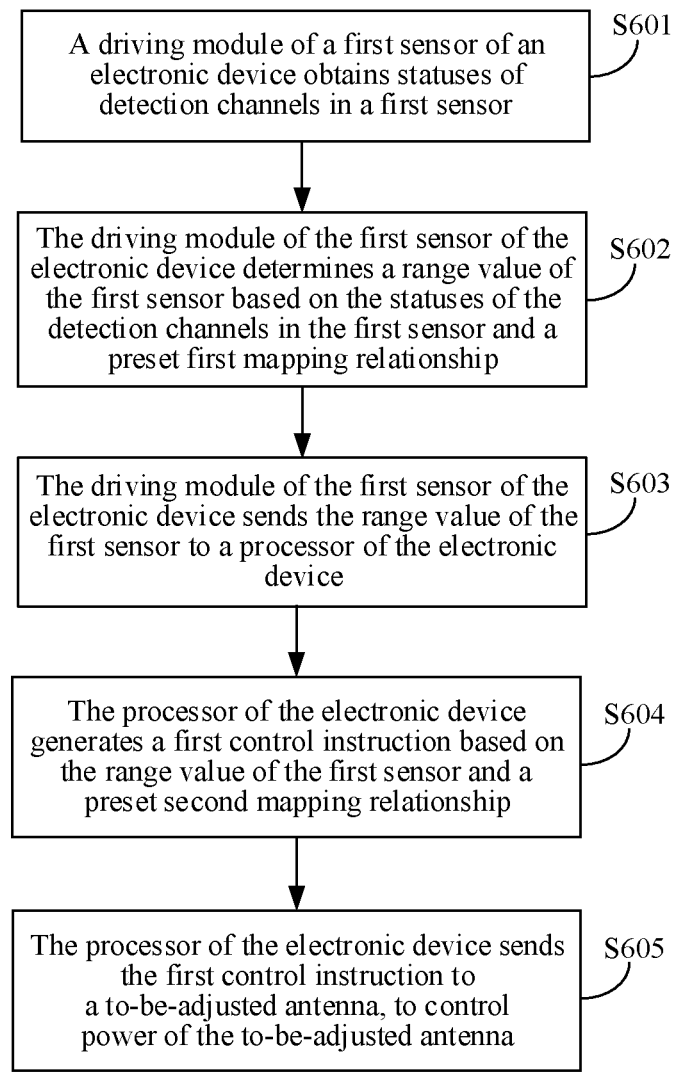
FIG. 6 is a schematic flowchart of an antenna power control method according to an embodiment of this application.

FIG. 6 is a schematic flowchart of an antenna power control method according to an embodiment of this application. As shown in FIG. 6, the method may include S601 to S605.

S601. A driving module of a first sensor of the electronic device obtains statuses of detection channels in the first sensor.

It is to be noted that, in this embodiment of this application, the driving module of the first sensor may also be referred to as a first driving module. The first sensor may be the SAR sensor shown in FIG. 5, and the driving module of the first sensor may be the driving module of the SAR sensor. There may be one or more first sensors, which is not specifically limited herein.

For example, signals obtained by the SAR sensor through detection channels may include a first signal and a second signal. In other words, signals transmitted in the detection channels may include a first signal and a second signal. When a value of capacitance between an antenna and the human body is greater than the first threshold, a signal transmitted in a detection channel corresponding to the antenna may be a first signal. When a value of capacitance between an antenna and the human body is less than the first threshold, a signal transmitted in a detection channel corresponding to the antenna may be a second signal.

In this embodiment of this application, when the detection channel transmits a first signal, a status of the detection channel may be referred to as a trigger state or a first state of the detection channel. When the detection channel transmits a second signal, the status of the detection channel is referred to as a non-trigger state or a second state of the detection channel.

In this embodiment of this application, the first sensor may include a plurality of detection channels, and the detection channels are configured to connect the first sensor and antennas. Different antennas are connected to the first sensor through different detection channels. For example, the first sensor may include four detection channels, and may be connected to four different antennas through the four detection channels. The first sensor may also include three detection channels, and may be connected to three different antennas through the three detection channels.

The status of the detection channel may indicate that a distance between a corresponding antenna and the human body is less than a preset distance. For example, the status of the detection channel may include a trigger state and a non-trigger state. The trigger state of the detection channel indicates that the distance between the corresponding antenna and the human body is less than the preset distance. The non-trigger state of the detection channel indicates that the distance between the corresponding antenna and the human body is greater than or equal to the preset distance. In some embodiments, the preset distance may be 5 cm, 10 cm, or the like. It is to be noted that, the antenna corresponding to the detection channel refers to an antenna to which the first sensor is connected through the detection channel.

In addition, the SAR sensor, as a capacitive sensor, is usually arranged on a mainboard of the electronic device. When the detection channels of the SAR sensor have long wires on the mainboard, heat generated when the mainboard of the electronic device works causes sensing capacitance of the SAR sensor to change greatly, which affects accuracy of the SAR sensor. To resolve the problem, in some embodiments of this application, the first sensor may include a plurality of detection channels and a plurality of reference channels. Different antennas are connected to the first sensor through different detection channels. When a length of the wire of the detection channel on the mainboard is greater than a preset length, an antenna of the first sensor corresponding to the detection channel may further be connected through the reference channel, and the preset length may be 2 cm, 3 cm, or the like. In this way, the first sensor may detect a value of capacitance between the antenna and the human body through the reference channel, and calibrate, based on the value of the capacitance, a value of capacitance between the antenna and the human body detected through the detection channel, thereby reducing a measurement error of the first sensor and improving the accuracy of the first sensor.

Figure 7:
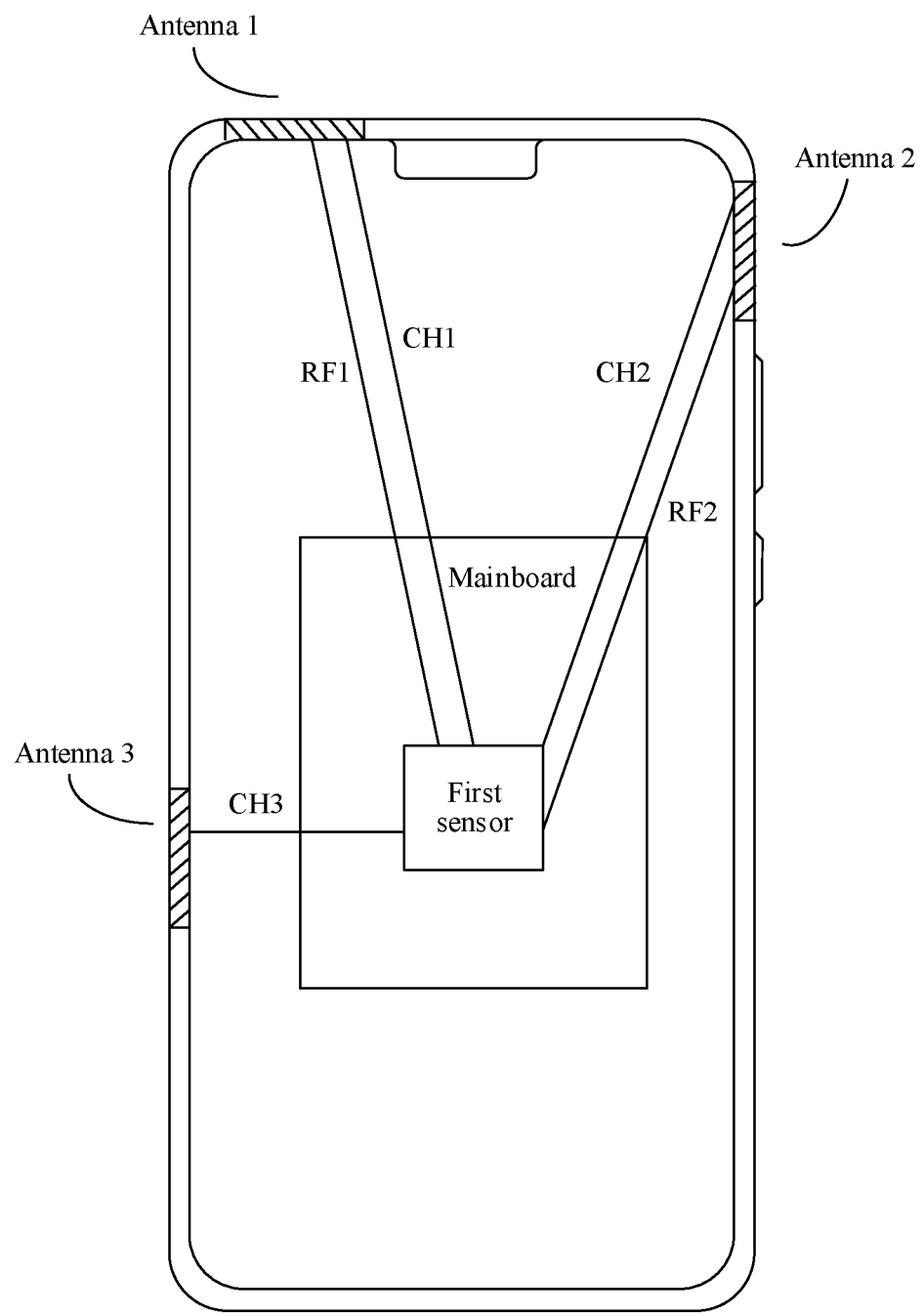
FIG. 7 is a schematic diagram of connection of a first sensor having five channels according to an embodiment of this application.

An example in which the first sensor has five channels is used. FIG. 7 is a schematic diagram of connection of a first sensor having five channels according to an embodiment of this application. As shown in FIG. 7, the first sensor having five channels are arranged on a mainboard, and include three detection channels and two reference channels. The three detection channels respectively are CH1, CH2, and CH3, the two reference channels respectively are RF1 and RF2, and the preset length is 2 cm. The first sensor is connected to an antenna 1 through CH1, connected to an antenna 2 through CH2, and connected to an antenna 3 through CH3. When lengths of wires of CH1 and CH2 on the mainboard are greater than 2 cm, and a length of a wire of CH3 on the mainboard is less than 2 cm, the first sensor and the antenna 1 may further be connected through RF1, and the first sensor and the antenna 2 may further be connected through RF2. In this way, the first sensor is separately connected to the antenna 1 and the antenna 2 through double channels. The first sensor may calibrate a value of capacitance between the antenna 1 and the human body detected through CH1 based on a value of capacitance between the antenna 1 and the human body detected through RF1, and calibrate a value of capacitance between the antenna 2 and the human body detected through CH2 based on a value of capacitance between the antenna 2 and the human body detected through RF2. Therefore, the measurement error of the first sensor is reduced and the accuracy of the first sensor is improved.

In a possible implementation, the driving module of the first sensor in the electronic device may record the statuses of the detection channels by using 1 and 0. The two first sensors shown in FIG. 5 are used as an example, and the two first sensors respectively are a second sensor and a third sensor. The second sensor includes three detection channels CH1, CH2, and CH3, and the third sensor includes three detection channels CH4, CH5, and CH6. CH1 is connected to the antenna 1, CH2 is connected to the antenna 2, CH3 is connected to the antenna 3, CH4 is connected to the antenna 4, CH5 is connected to the antenna 5, and CH6 is connected to the antenna 6. Statuses of the detection channels recorded by the driving modules of the first sensors may be shown in Table 1.

TABLE 1

| Sequence number of first sensor | Detection channel | Status of detection channel | | | | | | | |
|---|---|---|---|---|---|---|---|---|---|
| Second sensor | CH1 | 0 | 1 | 0 | 1 | 0 | 1 | 0 | 1 |
| | CH2 | 0 | 0 | 1 | 1 | 0 | 0 | 1 | 1 |
| | CH3 | 0 | 0 | 0 | 0 | 1 | 1 | 1 | 1 |
| Third sensor | CH4 | 0 | 1 | 0 | 1 | 0 | 1 | 0 | 1 |
| | CH5 | 0 | 0 | 1 | 1 | 0 | 0 | 1 | 1 |
| | CH6 | 0 | 0 | 0 | 0 | 1 | 1 | 1 | 1 |

That the status of the detection channel in Table 1 is 0 means that the detection channel is in a non-trigger state. That the status of the detection channel is 1 means that the detection channel is in a trigger state. Table 1 may be pre-stored in storage space that can be invoked by the processor.

It may be learnt from Table 1 that, for the first sensor including three detection channels, the statuses of the three detection channels may be combined to produce eight results. It may be deduced that, for a first sensor including n detection channels, statuses of the n detection channels may be combined to produce $2^n$ results.

It may be understood that, after the driving module of the first sensor obtains the statuses of the detection channels in the first sensor, the statuses of the detection channels in the first sensor may be encapsulated, and then the encapsulated data is sent to the processor of the electronic device, to reduce a data transmission amount and an amount of data processed by the processor.

S602. The driving module of the first sensor of the electronic device determines a range value of the first sensor based on the statuses of the detection channels in the first sensor and a preset first mapping relationship.

In this embodiment of this application, the range value of the first sensor may also be referred to as a first range value.

The first mapping relationship indicates a correspondence between the statuses of the detection channels and range values. The range value of the first sensor indicates the statuses of the detection channels in the first sensor. In other words, the statuses of the detection channels in the first sensor may be determined based on the range value of the first sensor.

In the electronic device, the relationship between different statuses of the detection channels and the range value of the first sensor may be maintained through a preset mapping relationship. For example, when the detection channels are in different statues, the range value of the first sensor may be determined through a mapping relationship shown in Table 2 below. The example of FIG. 5 is still used. The preset first mapping relationship in this embodiment of this application may be shown in Table 2.

TABLE 2

| Sequence number of first sensor | Detection channel | Status of detection channel | | | | | | | |
|---|---|---|---|---|---|---|---|---|---|
| Second sensor | CH1 | 0 | 1 | 0 | 1 | 0 | 1 | 0 | 1 |
| | CH2 | 0 | 0 | 1 | 1 | 0 | 0 | 1 | 1 |
| | CH3 | 0 | 0 | 0 | 0 | 1 | 1 | 1 | 1 |
| Range value | | 0 | 1 | 2 | 3 | 4 | 5 | 6 | 7 |
| Third sensor | CH4 | 0 | 1 | 0 | 1 | 0 | 1 | 0 | 1 |
| | CH5 | 0 | 0 | 1 | 1 | 0 | 0 | 1 | 1 |
| | CH6 | 0 | 0 | 0 | 0 | 1 | 1 | 1 | 1 |
| Range value | | 0 | 1 | 2 | 3 | 4 | 5 | 6 | 7 |

Table 2 may be pre-stored in storage space that can be invoked by the driving module of the first sensor.

When the driving module of the first sensor of the electronic device obtains the statuses of the detection channels in the first sensor, the range value of the first sensor may be determined according to Table 2. For example, if the driving modules of the first sensors obtain that the status of CH1 is 1, that the status of CH2 is 0, that the status of CH3 is 1, that the status of CH4 is 0, that the status of CH5 is 1, and that the status of CH6 is 0, the driving modules of the first sensors may determine that the range value of the second sensor is 5, and that the range value of the third sensor is 2.

When the driving module of the first sensor of the electronic device obtains the statuses of the detection channels in the first sensor, the statuses of the detection channels in the first sensor may be encapsulated into the range value of the first sensor. The range value of the first sensor is sent to the processor of the electronic device, to reduce a data transmission amount and an amount of data that the processor needs to process, thereby reducing data processing pressure on the processor.

With reference to the example of Table 2, in a case that the electronic device is provided with the second sensor and the third sensor, the statuses of the plurality of antennas connected to each sensor may be encapsulated into one range value. For example, if the driving module of the first sensor detects that the status of CH1 is 1, that the status of CH2 is 0, and that the status of CH3 is 1, the driving module of the first sensor may encapsulate the statuses of the detection channels in the second sensor into a range value of 5 of the second sensor.

S603. The driving module of the first sensor of the electronic device sends the rang value of the first sensor to the processor of the electronic device.

It is to be noted that, in a case that a plurality of first sensors work simultaneously, each first sensor may correspond to one range value. The driving module corresponds to each sensor may transmit the corresponding range value to the processor. For example, in a case that there are two first sensors, two values may be transmitted to the processor.

S604. The processor of the electronic device generates a first control instruction based on the range value of the first sensor and a preset second mapping relationship. The second mapping relationship indicates a correspondence between range values of the first sensor and control instructions. The first control instruction includes a to-be-adjusted antenna and a power range. The first control instruction instructs the to-be-adjusted antenna to adjust power to the power range.

S605. The processor of the electronic device sends the first control instruction to the to-be-adjusted antenna, to control the power of the to-be-adjusted antenna.

The to-be-adjusted antenna is an antenna in the first state. In this embodiment of this application, the to-be-adjusted antenna may also be referred to as a first antenna or a second antenna.

In an example, the processor of the electronic device may receive the range value of the first sensor by using a first interface function, and if there are a plurality of first sensors, there are also a plurality of first interface functions correspondingly. For example, for the second sensor and the third sensor shown in FIG. 5, the processor of the electronic device may define that a second interface function sensor1_value=X(0-7), and that a third interface function sensor2_value=X(0-7). sensor1_value is used for receiving a range value of the second sensor, and sensor2_value is used for receiving a range value of the third sensor. In an example, the first control instruction may include an identifier of the to-be-adjusted antenna and the power range. The processor of the electronic device may adjust transmit power of the to-be-adjusted antenna to the power range through the first control instruction. In this embodiment of this application, the power range in the first control instruction may also be referred to as first power.

The example of FIG. 5 is still used. The preset second mapping relationship in this embodiment of this application may be shown in Table 3 below.

TABLE 3

| Range value of second sensor | Range value of third sensor | First control instruction | Power range | To-be-adjusted antenna |
|---|---|---|---|---|
| 0 | 0 | 1 | 1 | none |
| 0 | 1 | 2 | 2 | antenna 4 |
| 0 | 2 | 3 | 3 | antenna 5 |
| 0 | 3 | 4 | 4 | antenna 4, antenna 5 |
| 0 | 4 | 5 | 5 | antenna 6 |
| 0 | 5 | 6 | 6 | antenna 4, antenna 6 |
| 0 | 6 | 7 | 7 | antenna 5, antenna 6 |
| 0 | 7 | 8 | 8 | antenna 4, antenna 5, antenna 6 |
| 1 | 0 | 9 | 9 | antenna 1 |
| 1 | 1 | 10 | 10 | antenna 1, antenna 4 |
| 1 | 2 | 11 | 11 | antenna 1, antenna 5 |
| 1 | 3 | 12 | 12 | antenna 1, antenna 4, antenna 5 |
| ... | ... | ... | ... | ... |
| 7 | 5 | 62 | 62 | antenna 1, antenna 2, antenna 3, antenna 4, antenna 6 |

TABLE 3-continued

| Range value of second sensor | Range value of third sensor | First control instruction | Power range | To-be-adjusted antenna |
|---|---|---|---|---|
| 7 | 6 | 63 | 63 | antenna 1, antenna 2, antenna 3, antenna 5, antenna 6 |
| 7 | 7 | 64 | 64 | antenna 1, antenna 2, antenna 3, antenna 4, antenna 5, antenna 6 |

Table 3 may be pre-stored in storage space that can be invoked by the processor.

It may be learnt from Table 3 that, when the processor of the electronic device receives the range values of the first sensors, a first control instruction including a to-be-adjusted antenna and a power range may be generated according to Table 3. For example, if the range value of the second sensor obtained by the processor of the electronic device is 1, and the range value of third sensor is 2, the processor of the electronic device may generate a first control instruction 11. The first control instruction 11 includes identifiers of to-be-adjusted antennas (the antenna 1 and the antenna 5) and a power range of 11. The processor of the electronic device adjusts transmit power of the antenna 1 and the antenna 5 to the power range of 11 through the first control instruction 11. In this way, the processor of the electronic device does not need to process the status of each detection channel, and may determine, based on the range value of each first sensor only, an antenna whose power needs to be adjusted and an adjustment range of the power. An amount of processed data is small and data processing efficiency is high.

In some embodiments, to-be-adjusted antennas may be all antennas connected to the first sensors. The second mapping relationship may also indicate a mapping relationship between the range values of the first sensors and power ranges of all antennas connected to the first sensors. In other words, according to the second mapping relationship, power ranges of all antennas may be determined based on the range value of each first sensor. The power range of the antenna herein may also be referred to as second power.

In some scenarios, a user often needs to put an earpiece of the electronic device close to an ear to listen, through the earpiece, to sound output by the electronic device. In this scenario, a head of the user is close to the earpiece, and if an antenna nearby the earpiece radiates at high power in this case, health of the user is adversely affected.

In this embodiment of this application, the processor of the electronic device may further obtain a status of the earpiece in the electronic device, and adjust power of an antenna nearby the earpiece based on the status of the earpiece. For example, if the status of the earpiece is an on state, the processor of the electronic device may send a second control instruction to an antenna nearby the earpiece, and skip sending a first control instruction to the to-be-adjusted antenna. The second control instruction instructs the antenna nearby the earpiece to adjust power to a preset range. The antenna nearby the earpiece may specifically refer to an antenna whose distance from the earpiece is less than a preset distance, and may also be referred to as a third antenna. The preset distance may be 1 cm, 2 cm, or the like, and the preset range may be a lowest range of the power of the antenna. This is not specifically limited herein. In this way, when the user communicates through the earpiece, the antenna nearby the earpiece has less adverse impact on health of the user, and the communication performance of the electronic device can be ensured.

In this embodiment of this application, the first mapping relationship includes a mapping relationship between statuses of at least two detection channels, a status of at least one extended detection channel, and the first range value. The status of the extended detection channel is any one of a third state and a fourth state. The third state indicates that a value of capacitance between an antenna connected to the extended detection channel and the human body is greater than the first threshold. The fourth state indicates that the extended detection channel does not exist in the electronic device, or that the value of the capacitance between the antenna connected to the extended detection channel and the human body is less than the first threshold. That is to say, that the extended detection channel is in the third state means that the extended detection channel is in the foregoing trigger state. That the extended detection channel is in the fourth state means that the extended detection channel is in the foregoing non-trigger state or that the extended detection channel does not exist in the electronic device.

In this way, when a quantity of the detection channels in the first sensor increases, as long as a quantity of increased detection channels is less than or equal to a quantity of extended detection channels, processing logic of the first drive and the processor in this solution needs no change. In other words, this solution has good scalability and compatibility. Specific description is provided below.

Figure 8:
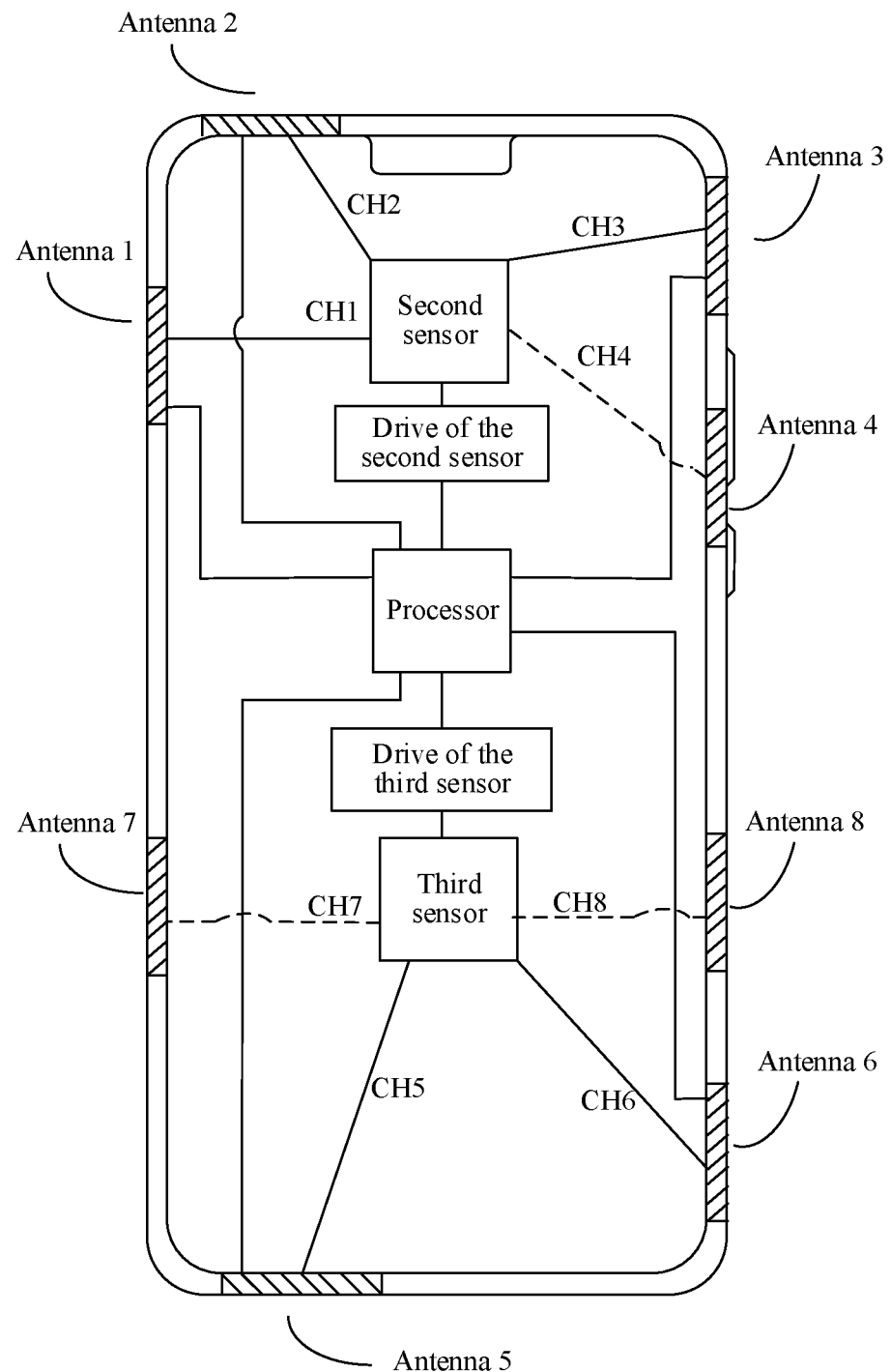
FIG. 8 is a schematic diagram of connection of a sensor according to an embodiment of this application.

FIG. 8 is a schematic diagram of connection of sensors according to an embodiment of this application. A connection relationship of sensors in an electronic device may be shown in FIG. 8. The electronic device includes a second sensor and a third sensor. The second sensor includes three detection channels, and the three detection channels respectively are CH1, CH2, and CH3. The second sensor is connected to an antenna 1 through CH1, connected to an antenna 2 through CH2, and connected to an antenna 3 through CH3. The third sensor includes two detection channels and the two detection channels respectively are CH5 and CH6. The third sensor is connected to an antenna 5 through CH5, and connected to an antenna 6 through CH6.

In a first mapping relationship provided in this embodiment of this application, one extended detection channel CH4 is added for the second sensor, and extended detection channels CH7 and CH8 are added for the third sensor. That is to say, a driving module of the second sensor may determine a range value of the second sensor based on statuses of the three detection channels, a status of the one extended detection channel, and the first mapping relationship. A driving module of the third sensor may determine a range value of the third sensor based on statuses of the two detection channels, statuses of the two extended detection channels, and the first mapping relationship. The first mapping relationship may be shown in Table 4 below.

TABLE 4

| Sequence number of sensor | Detection channel | Status of detection channel | | | | | | | | | | | | | | | Interface function of processor |
|---|---|---|---|---|---|---|---|---|---|---|---|---|---|---|---|---|---|
| Second sensor | CH1 | 0 | 1 | 0 | 0 | 0 | 1 | 1 | 1 | 0 | 0 | 0 | 1 | 1 | 1 | 0 | 1 | sensor1_value |
| | CH2 | 0 | 0 | 1 | 0 | 0 | 1 | 0 | 0 | 1 | 1 | 0 | 1 | 1 | 0 | 1 | 1 | |
| | CH3 | 0 | 0 | 0 | 1 | 0 | 0 | 1 | 0 | 1 | 0 | 1 | 1 | 0 | 1 | 1 | 1 | |
| | CH4 | 0 | 0 | 0 | 0 | 1 | 0 | 0 | 1 | 0 | 1 | 1 | 0 | 1 | 1 | 1 | 1 | |
| Range value | | 0 | 1 | 2 | 3 | 4 | 5 | 6 | 7 | 8 | 9 | 10 | 11 | 12 | 13 | 14 | 15 | |
| Third sensor | CH5 | 0 | 1 | 0 | 0 | 0 | 1 | 1 | 1 | 0 | 0 | 0 | 1 | 1 | 1 | 0 | 1 | sensor2_value |
| | CH6 | 0 | 0 | 1 | 0 | 0 | 1 | 0 | 0 | 1 | 1 | 0 | 1 | 1 | 0 | 1 | 1 | |
| | CH7 | 0 | 0 | 0 | 1 | 0 | 0 | 1 | 0 | 1 | 0 | 1 | 1 | 0 | 1 | 1 | 1 | |
| | CH8 | 0 | 0 | 0 | 0 | 1 | 0 | 0 | 1 | 0 | 1 | 1 | 0 | 1 | 1 | 1 | 1 | |
| Range value | | 0 | 1 | 2 | 3 | 4 | 5 | 6 | 7 | 8 | 9 | 10 | 11 | 12 | 13 | 14 | 15 | |

That the status of the detection channel in Table 4 is 0 means that the detection channel is in a non-trigger state. That the status of the detection channel is 1 means that the detection channel is in a trigger state. That the status of the extended detection channel is 0 means that the extended detection channel is in the non-trigger state or that the extended detection channel does not exist in the electronic device. That the status of the extended detection channel is 1 means that the extended detection channel is in the trigger state.

As shown in Table 4, the drive of the second sensor may encapsulate the statuses of CH1, CH2, and CH3 into the range value of the second sensor according to the first mapping relationship. For example, if the status of CH1 is 0, the status of CH2 is 1, the status of CH3 is 1, and CH4 does not exist in the electronic device, in other words, the status of CH4 is 0, the driving module of the second sensor may determine that the range value of the second sensor is 8 according to the first mapping relationship. Similarly, the drive of the third sensor may encapsulate the statuses of CH5 and CH6 into the range value of the third sensor according to the first mapping relationship.

After the processor receives the range value of the second sensor and the range value of the third sensor, a to-be-adjusted antenna and a power range may be determined according to a second mapping relationship shown in FIG. 5.

TABLE 5

| Range value of second sensor | Range value of third sensor | First control instruction | Power range | To-be-adjusted antenna |
|---|---|---|---|---|
| 0 | 0 | 1 | 1 | none |
| 0 | 1 | 2 | 2 | antenna 5 |
| 0 | 2 | 3 | 3 | antenna 6 |
| 0 | 3 | 4 | 4 | antenna 7 |
| 0 | 4 | 5 | 5 | antenna 8 |
| 0 | 5 | 6 | 6 | antenna 5, antenna 6 |
| 0 | 6 | 7 | 7 | antenna 6, antenna 7 |
| 0 | 7 | 8 | 8 | antenna 5, antenna 8 |
| 0 | 8 | 9 | 9 | antenna 6, antenna 7 |
| 0 | 9 | 10 | 10 | antenna 6, antenna 8 |
| 0 | 10 | 11 | 11 | antenna 7, antenna 8 |
| 0 | 11 | 12 | 12 | antenna 5, antenna 6, antenna 7 |
| ... | ... | ... | ... | ... |
| 15 | 13 | 254 | 254 | antenna 1, antenna 2, antenna 3, antenna 4, antenna 5, antenna 7, antenna 8 |
| 15 | 14 | 255 | 255 | antenna 1, antenna 2, antenna 3, antenna 4, antenna 6, antenna 7, antenna 8 |
| 15 | 15 | 256 | 256 | antenna 1, antenna 2, antenna 3, antenna 4, antenna 5, antenna 6, antenna 7, antenna 8 |

In Table 5, an antenna connected to the extended detection channel CH4 is referred to as the antenna 4, an antenna connected to the extended detection channel CH7 is referred to as the antenna 7, and an antenna connected to the extended detection channel 8 is referred to as the antenna 8.

As shown in Table 5, the processor may determine a first control instruction based on the range value of the second sensor and the range value of the third sensor, and send the first control instruction to a to-be-adjusted antenna, to adjust transmit power of the to-be-adjusted antenna to a corresponding power range. For example, if the range value of the second sensor received by the processor is 0, and the range value of the third sensor is 7, the processor may determine that to-be-adjusted antennas are the antenna 5 and the antenna 8 according to the foregoing mapping relationship. Because the electronic device has no extended detection channel, in other words, the antenna 8 has no corresponding physical antenna, the processor only needs to send a corresponding first control instruction 8 to the antenna 5, so as to adjust transmit power of the antenna 5 to the power range of 8. It may be understood that, 1 to 256 in the first control instruction only refer to names of first control instructions, to distinguish the first control instructions, but does not represent actual content of the first control instructions.

In this embodiment of this application, when one detection channel CH4 connected to the antenna 4 is added for the second sensor, one detection channel CH7 connected to the antenna 7 and one detection channel CH8 connected to the antenna 8 are added for the third sensor, the foregoing first mapping relationship and second mapping relationship need no change. In other words, the driving module of the second sensor can still determine the range value of the second sensor according to the foregoing first mapping relationship, the driving module of the third sensor can still determine the range value of the third sensor according to the first mapping relationship, and the processor can still determine the to-be-adjusted antenna and the power range according to the second mapping relationship.

For example, if the driving module of the second sensor obtains that the statuses of CH1 to CH4 are all 0, it may be determined according to the foregoing first mapping relationship that the range value of the second sensor is 0. If the driving module of the third sensor obtains that the status of CH1 is 1, the statuses of CH2 and CH3 are 0, and the status of CH4 is 1, it may be determined according to the foregoing first mapping relationship that the range value of the third sensor is 7. The processor may determine that the to-be-adjusted antenna is the antenna 5 and the antenna 8 based on that the range value of the second sensor is 0 and that the range value of the third sensor is 7 according to the foregoing second mapping relationship. The processor sends a corresponding first control instruction 8 to the antenna 5 and the antenna 8, to adjust transmit power of the antenna 5 and the antenna 8 to a power range of 8. As can be seen, compared with not adding the detection channels for the sensors, after the detection channels are added for the sensors, processing logic of the driving modules of the sensors and the processor has no change.

In the related art, the drives of the sensors may directly report the statuses of the detection channels of the sensors to the processor, and the processor determines the to-be-adjusted antenna based on the statuses of the detection channels and a preset mapping relationship. The electronic device shown in FIG. 8 is used as an example. The preset mapping relationship may be shown in Table 6 below:

TABLE 6

| Name of sensor Detection channel | Second sensor | | | Third sensor | | To-be-adjusted antenna |
|---|---|---|---|---|---|---|
| | CH1 | CH2 | CH3 | CH5 | CH6 | |
| | 0 | 0 | 0 | 0 | 0 | none |
| | 0 | 0 | 0 | 1 | 0 | antenna 5 |
| | 0 | 0 | 0 | 0 | 1 | antenna 6 |
| | 0 | 0 | 0 | 1 | 1 | antenna 5, antenna 6 |
| | 1 | 0 | 0 | 0 | 0 | antenna 1, antenna 5 |
| | 1 | 0 | 0 | 1 | 0 | antenna 1, antenna 6 |
| | . . . | | | | | |
| | 1 | 1 | 1 | 0 | 1 | antenna 1, antenna 2, antenna 3, antenna 6 |
| | 1 | 1 | 1 | 1 | 1 | antenna 1, antenna 2, antenna 3, antenna 5, antenna 6 |
| Interface function of processor | CH1_value | CH2_value | CH3_value | CH5_value | CH6_value | |

As can be seen, in the related art, when the detection channels of the sensors increase, the foregoing preset mapping relationship needs to be changed correspondingly. For example, if a detection channel CH4 connected to an antenna 4 is added for the second sensor, a mapping relationship between CH4 in different states and the to-be-adjusted antenna needs to be added to the foregoing preset mapping relationship. That is to say, in the related art, the foregoing preset mapping relationship needs to be changed based on a quantity of the detection channels of the sensors, and this solution has poor compatibility and scalability.

With reference to the foregoing description of Table 4 and Table 5, in the antenna power control solution provided in this embodiment of this application, the first mapping relationship is arranged to include the mapping relationship between the statuses of the at least two detection channels, the status of the at least one extended detection channel, and the first range value. In this way, when a quantity of detection channels of the first sensor increases, as long as a quantity of increased detection channels is less than or equal to a quantity of extended detection channels, the first mapping relationship and the second mapping relationship need no change, processing logic of the first drive and the processor needs no change, thereby resolving the problem of poor compatibility and scalability of the antenna power control solution provided in the related art.

In addition, in the related art, as shown in Table 6, the processor usually receives the status of CH1 by using the interface function CH1_value, receives the status of CH2 by using the interface function CH2_value, receives the status of CH3 by using the interface function CH3_value, receives the status of CH5 by using the interface function CH5_value, and receives the status of CH6 by using the interface function CH6_value.

In this way, when a quantity of detection channels in the sensors increases, a corresponding interface function also needs to be configured in the processor for receiving a status of an increased detection channel. For example, if a detection channel CH4 connected to an antenna 4 is added for the second sensor, an interface function CH4_value for receiving a status of the antenna 4 needs to be configured in the processor. That is to say, in the related art, the processor needs to configure, based on the quantity of the detection channels of the sensors, a corresponding quantity of interface functions, which results in poor compatibility.

In this antenna power control solution provided in this embodiment of this application, as shown in Table 4, the first interface function includes the second interface function sensor1_value and the third interface function sensor2_value. The processor receives the range value of the second sensor by using the second interface function sensor1_value, where sensor1_value=X(0-15), and X is the range value of the second sensor and may be any integer from 0 to 15. The processor receives the range value of the third sensor by using the third interface function sensor2_value, where sensor2_value=X(0-15), and X is the range value of the third sensor and may be any integer from 0 to 15.

In this way, a quantity of the interface functions in the processor corresponds to the quantity of the first sensors. No matter how the quantity of the detection channels of the sensors changes, the processor only needs to receive the range values of the sensors by using these interface functions, and there is no need to add an interface function or change the interface functions. For example, as shown in FIG. 8, the electronic device includes a second sensor including three detection channels and a third sensor including two detection channels. The processor receives a range value of the second sensor by using the interface function sensor1_value, and receives a range value of the second sensor by using the interface function sensor2_value. No matter how a quantity of the detection channels of the first sensor and the second sensor changes, the processor still only needs to receive the range value of the second sensor by using the interface function sensor1_value, and receive the range value of the second sensor by using the interface function sensor2_value, and there is no need to add an interface function or change the interface functions.

With reference to the foregoing description of the interface functions, in the antenna power control solution provided in this embodiment of this application, the interface functions for receiving the range values of the sensors are configured for the processor, so that the processor is suitable for sensors with different detection channels and has high compatibility.

Similar to the extended detection channel, at least one extended sensor may also be included in the first mapping relationship provided in this embodiment of this application. The extended sensor includes at least one extended detection channel. The first mapping relationship may include a mapping relationship between a status of each extended detection channel in the extended sensor and a first range value of the extended detection channel. The second mapping relationship may include a mapping relationship between the range value of the first sensor, the range value of the extended sensor, the to-be-adjusted antenna, and the power range. In this way, when a quantity of the first sensors increases, as long as a quantity of increased first sensors is less than or equal to a quantity of extended sensors, processing logic of the first drive and the processor in this solution needs no change, thereby having high compatibility and scalability;

So far, a person skilled in the art should have a clear and explicit understanding of the antenna power control solution provided in this embodiment of this application. It is to be noted that, in the foregoing examples, the second sensor and the third sensor are only used as an example, in some other implementations of this application, there may also be one, three, or more first sensors, and for a specific implementation manner thereof, refer to the foregoing embodiments, which are not described again.

It may be understood that, with reference to the foregoing description, the antenna power control method provided in the embodiments of this application can reduce an amount of data processed by the processor of the electronic device and improve data processing efficiency.

The solutions provided in the embodiments of this application are mainly described above from the perspective of the electronic device. To implement the foregoing functions, the electronic device includes corresponding hardware structures and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

In the embodiments of this application, functional modules of the device may be divided based on the foregoing method example. For example, each functional module may be divided according to each function, or two or more functions may be integrated into one processing module. The integrated module is implemented in the form of hardware, or is implemented in the form of a software functional module. It is to be noted that, in the embodiments of this application, the module division is an example, and is merely logical function division, and there may be other division modes during actual implementation.

Figure 9:
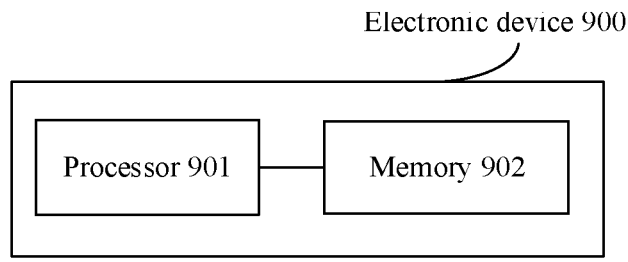
FIG. 9 is a schematic diagram of an electronic device according to an embodiment of this application.

FIG. 9 is a schematic diagram of composition of an electronic device 900 according to an embodiment of this application. The electronic device 900 may be any electronic device in the foregoing examples, for example, the electronic device 900 may be a mobile phone, a computer, or the like. For example, as shown in FIG. 9, the electronic device 900 may include: a processor 901 and a memory 902. The memory 902 is configured to store a computer execution instruction. For example, in some embodiments, when the processor 901 executes the instruction stored in the memory 902, the electronic device 900 may be enabled to perform any one of functions of the electronic device in the foregoing embodiments, to implement any antenna power control method in the foregoing examples.

It is to be noted that, all related content of the steps in the foregoing method embodiment may be quoted to functional descriptions of corresponding functional modules, and details are not described herein again.

Figure 10:
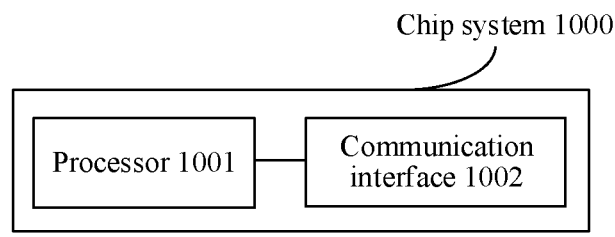
FIG. 10 is a schematic diagram of a chip system according to an embodiment of this application.

FIG. 10 is a schematic diagram of composition of a chip system 1000 according to an embodiment of this application. The chip system 1000 may be arranged in an electronic device. For example, the chip system 1000 may be arranged in a mobile phone. For example, the chip system 1000 may include: a processor 1001 and a communication interface 1002, configured to support the electronic device in implementing the functions involved in the foregoing embodiments. In a possible design, the chip system 1000 further includes a memory. The memory is configured to store a program instruction and data necessary to the electronic device. The chip system may include a chip, or may include a chip and another discrete device. It is to be noted that, in some implementations of this application, the communication interface 1002 may also be referred to as an interface circuit.

It is to be noted that, all related content of the steps in the foregoing method embodiment may be quoted to functional descriptions of corresponding functional modules, and details are not described herein again.

Figure 11:
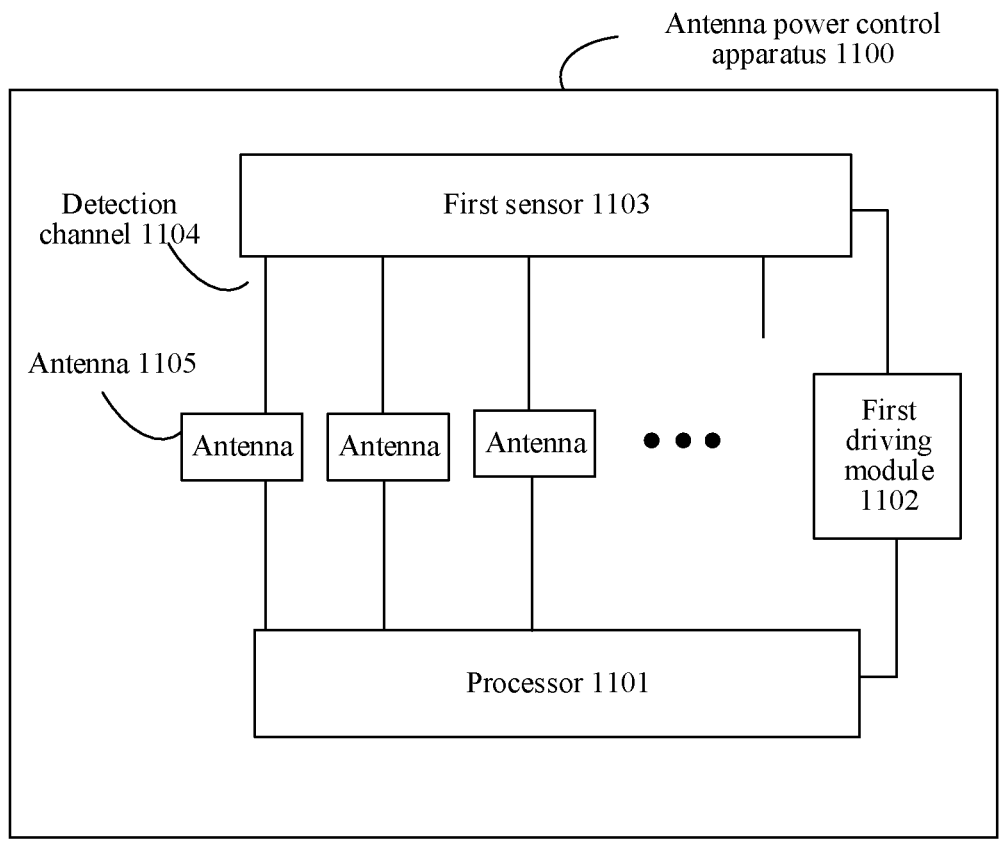
FIG. 11 is a schematic diagram of an antenna power control apparatus according to an embodiment of this application.

FIG. 11 is a schematic diagram of an antenna power control apparatus 1100 according to an embodiment of this application. The apparatus includes a processor 1101, a first driving module 1102, a first sensor 1103, at least two detection channels 1104, and at least two antennas 1105. A quantity of the detection channels 1104 is greater than or equal to a quantity of the antennas 1105. The first sensor 1103 is connected to the at least two antennas 1105 through the detection channels 1104, and each antenna 1105 corresponds to one detection channel 1104. The first sensor 1103 is configured to obtain statuses of the at least two detection channels 1104. Each detection channel 1104 corresponds to one status, and the status is any one of a first state and a second state. The first state indicates that a value of capacitance between an antenna 1105 corresponding to the detection channel 1104 and a human body is greater than a first threshold. The second state indicates that the value of the capacitance between the antenna 1105 corresponding to the detection channel 1104 and the human body is less than the first threshold. The first driving module 1102 is configured to determine a first range value based on the statuses of the at least two detection channels 1104. The processor 1101 is configured to control transmit power of the at least two antennas 1105 based on the first range value.

It is to be noted that, all related content of the steps in the foregoing method embodiment may be quoted to functional descriptions of corresponding functional modules, and details are not described herein again.

All or some of the functions or motions or operations or steps in the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to specific features and the embodiments thereof, apparently, various modifications and combinations may be made to them without departing from the scope of this application. Correspondingly, this specification and the accompanying drawings are merely used as exemplary descriptions of this application defined by the appended claims, and are considered as having covered any of and all of modifications, variations, combinations, or equivalents within the scope of this application. Obviously, a person skilled in the art can make various modifications and variations to this application without departing from the scope of this application. If these modifications and variations of this application fall within the scope of the claims of this application and equivalent technologies thereof, this application is intended to include these modifications and variations.

What is claimed is:

1. An antenna power control method, wherein the method is applied to an electronic device, the electronic device comprises a processor, a first driving module, a first sensor, at least two detection channels, and at least two antennas, the first sensor is connected to the at least two antennas through the detection channels, and each of the antennas corresponds to one of the detection channels; and the method comprises:
   obtaining, by the first sensor, statuses of the at least two detection channels, wherein each of the detection channels corresponds to one status, the status is any one of a first state and a second state, the first state indicates that a value of capacitance between an antenna corresponding to the detection channel and a human body is greater than a first threshold, and the second state indicates that the value of the capacitance between the antenna corresponding to the detection channel and the human body is less than the first threshold;
   determining, by the first driving module, a first range value based on the statuses of the at least two detection channels; and
   controlling, by the processor, transmit power of the at least two antennas based on the first range value.

2. The method according to claim 1, wherein the determining, by the first driving module, a first range value based on the statuses of the at least two detection channels comprises:
   determining, by the first driving module, the first range value based on the statuses of the at least two detection channels and a preset first mapping relationship, wherein the first mapping relationship comprises a mapping relationship between the statuses of the at least two detection channels and the first range value.

3. The method according to claim 2, wherein the first mapping relationship comprises a mapping relationship between the statuses of the at least two detection channels, a status of at least one extended detection channel, and the first range value; the status of the extended detection channel is any one of a third state and a fourth state, the third state indicates that a value of capacitance between an antenna connected to the extended detection channel and the human body is greater than the first threshold, and the fourth state indicates that the extended detection channel does not exist in the electronic device, or that the value of the capacitance between the antenna connected to the extended detection channel and the human body is less than the first threshold; and the determining, by the first driving module, the first range value based on the statuses of the at least two detection channels and a first mapping relationship comprises:

determining, by the first driving module, the first range value based on the statuses of the at least two detection channels, the status of the at least one extended detection channel, and the preset first mapping relationship.

4. The method according to claim 3, wherein the controlling, by the processor, transmit power of the at least two antennas based on the first range value comprises:

receiving, by the processor, the first range value by using a first interface function, wherein the first range value corresponds to the statuses of the at least two detection channels and the status of the at least one extended detection channel; and controlling, by the processor, the transmit power of the at least two antennas based on the first range value.

5. The method according to claim 1, wherein the controlling, by the processor, transmit power of the at least two antennas based on the first range value comprises:

determining, by the processor, first power of each of the at least two antennas based on the first range value; and controlling, by the processor, the transmit power of the at least two antennas based on the first power of each antenna.

6. The method according to claim 1, wherein the controlling, by the processor, transmit power of the at least two antennas based on the first range value comprises:

determining, by the processor, a first antenna and second power based on the first range value, wherein a status of a detection channel corresponding to the first antenna is the first state, and the first antenna is comprised in the at least two antennas; and adjusting, by the processor, transmit power of the first antenna to the second power.

7. The method according to claim 6, wherein the determining, by the processor, a first antenna and second power based on the first range value comprises:

determining, by the processor, the first antenna and the second power based on the first range value and a preset second mapping relationship, wherein the second mapping relationship comprises a mapping relationship between the first range value, the first antenna, and the second power.

8. The method according to claim 1, wherein the obtaining, by the first sensor, statuses of the at least two detection channels comprises:

obtaining, by the first sensor, values of capacitance between the at least two antennas and the human body; and determining, by the first sensor when a value of capacitance between a second antenna and the human body is greater than the first threshold, a status of a detection channel corresponding to the second antenna as the first state, wherein the second antenna is comprised in the at least two antennas.

9. The method according to claim 8, wherein the obtaining, by the first sensor, values of capacitance between the at least two antennas and the human body comprises:

obtaining, by the first sensor, the values of the capacitance between the at least two antennas and the human body through the at least two detection channels.

10. The method according to claim 1, wherein the electronic device further comprises an earpiece, and the method further comprises:

obtaining, by the processor, a status of the earpiece, wherein the status of the earpiece comprises an on state and an off state; and lowering, by the processor, transmit power of a third antenna if the earpiece is in the on state, wherein the third antenna is an antenna whose distance from the earpiece is less than a third threshold, and the third antenna is comprised in the at least two antennas.

11. The method according to claim 1, wherein the processor is an application processor.

12. An electronic device, comprising one or more processors and one or more memories, wherein the one or more memories are coupled to the one or more processors, and the one or more memories store computer programs; and when the one or more processors execute the computer programs, the electronic device is enabled to perform the antenna power control method according to claim 1.

13. A chip system, wherein the chip system comprises a processing circuit and an interface; and the processing circuit is configured to invoke and run a computer program stored in a storage medium, to perform the antenna power control method according to claim 1.

* * * * *